(12) United States Patent
Pushparaj et al.

(10) Patent No.: US 7,971,489 B2
(45) Date of Patent: Jul. 5, 2011

(54) CARBON NANOTUBE-BASED LOAD CELLS

(75) Inventors: Victor L. Pushparaj, Sunnyvale, CA (US); Omkaram Nalamasu, San Jose, CA (US); Manoocher Birang, Los Gatos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 433 days.

(21) Appl. No.: 12/201,242

(22) Filed: Aug. 29, 2008

(65) Prior Publication Data

US 2010/0050779 A1 Mar. 4, 2010

(51) Int. Cl.
G01L 1/20 (2006.01)
G01M 5/00 (2006.01)

(52) U.S. Cl. ............. 73/774; 73/775; 73/777; 977/953; 977/956

(58) Field of Classification Search .................. 73/767, 73/774, 775, 776, 768, 802, 803; 977/902, 977/932, 953, 956
See application file for complete search history.

(56) References Cited

U.S. PATENT DOCUMENTS

| 7,312,096 B2 | 12/2007 | Kurtz |  |
| 2006/0283262 A1* | 12/2006 | Smits et al. | 73/799 |
| 2007/0138010 A1* | 6/2007 | Ajayan | 204/400 |

OTHER PUBLICATIONS

Cao et al., "Super-Compressible Foamlike Carbon Nanotube Films," Science, 310:1307-1310 (2005).
Iijima et al., "Structural Flexibility of Carbon Nanotubes", J. Chem. Phys., 104 (5):2089-2092 (1996).
Li et al., "Compression-Modulated Tunable-Pore Carbon-Nanotube Membrane Filters", Small oooo, oo, No. o, 1-5 (2007).
Pushparaj et al., "Effects of Compressive Strains on Electrical Conductivities of a Macroscale Carbon Nanotube Block", Applied Physics Letters, 91, 153116 (2007).
Qian et al., "Mechanics of Carbon Nanotubes", Appl. Mech. Rev. 55 (6):495-533 (2002).
Sazonova et al., "A Tunable Carbon Nanotube Electromechanical Oscillator", Nature 431:284-287 (2004).
Tombler et al., "Reversible Electromechanical Characteristics of Carbon Nanotubes Under Local-Probe Manipulation", Nature 405:769-772 (2000).
Yu et al., "Strength and Breaking Mechanism of Multiwalled Carbon Nanotubes Under Tensile Load", Science 287:637-640 (2000).

* cited by examiner

*Primary Examiner* — Lisa M Caputo
*Assistant Examiner* — Punam Roy
(74) *Attorney, Agent, or Firm* — Mark J. Danielson; Pillsbury Winthrop Shaw Pittman LLP

(57) ABSTRACT

A robust, stand-alone load cell comprises a block of aligned carbon nanotubes with parallel electrodes on opposing sides of the block and an electrical circuit connected between the electrodes for measuring the electrical resistance of the block. The nanotubes are preferably aligned perpendicular to the electrodes. Carbon nanotube-based load cells may be incorporated into a wafer assembly for characterizing semiconductor processing equipment. Such a wafer assembly includes two parallel wafers with a plurality of carbon nanotube load cells positioned between and attached to both wafers. The load cells are independently electrically connected to a device which monitors and records the resistivity of the load cell. According to further aspects of the invention, each of the load cell's parallel electrodes may be comprised of many small electrodes, where each small electrode on one side of the block has a corresponding small electrode on the opposing side of the block; corresponding pairs of small electrodes are connected in series to form a chain; an electrical circuit, connected to both ends of the chain of opposing pairs of electrodes, is used to measure the electrical resistance of the chain.

23 Claims, 7 Drawing Sheets

SECTION A-A

SECTION A-A

SECTION B-B

CARBON NANOTUBE-BASED LOAD CELLS

FIELD OF THE INVENTION

The present invention relates generally to load cells, and more particularly to load cells comprising carbon nanotubes as an active element.

BACKGROUND OF THE INVENTION

A load cell is typically an electronic device, known as a force transducer, which produces an electrical signal in response to an applied force. The load cell includes a strain gauge—a device which measures deformation of an object. The electrical resistance of the object changes with deformation, and the deformation of the object depends on the force applied to the object. The load cell contains electronics for measuring the resistance of the object, thus providing an electrical signal in response to the force applied to the load cell. The load cells are calibrated to allow for ready conversion of the electrical signal to a value for the magnitude of the force applied. Load cells may comprise multiple strain gauges, allowing for the direction of the force to be resolved.

Strain gauges, such as foil gauges, can be used to measure strains up to at least 10%. Semiconductor strain gauges, such as piezoresistors, are suitable only for measurement of small strains. There are many potential applications which require measurement of larger strains. Consequently, there is a need for strain gauges for incorporation into load cells that can measure larger compressive strains—in excess of 20%.

The conventional strain gauges are large—the smallest strain gauges available today being of the order of a few millimeters square. This limits the spatial resolution for measurement of the stresses and strains. The semiconductor industry and the semiconductor tool manufacturing industry has a need to monitor the stresses and strains induced in wafers during processing and desires higher spatial resolution than is offered by prior art strain gauges. Clearly, there is a need for higher spatial resolution strain gauges.

The electrical signal produced by a typical strain gauge is of the order of millivolts prior to amplification. This can be a problem in environments with high background electromagnetic emissions. Therefore, there is a need for strain gauges that produce larger electrical signals.

SUMMARY OF THE INVENTION

The concepts of the invention provide a robust, stand-alone load cell. The load cell comprises a block of aligned carbon nanotubes with parallel electrodes on opposing sides of the block and an electrical circuit connected between the electrodes for measuring the electrical resistance of the block. Furthermore, each electrode may be comprised of many small electrodes, where each small electrode on one side of the block has a corresponding small electrode on the opposing side of the block; corresponding pairs of electrodes are connected in series to form a chain. The nanotubes are preferably aligned perpendicular to the electrodes. The load cell may be configured to measure forces applied either parallel or perpendicular to the walls of the aligned nanotubes.

According to aspects of the invention, a carbon nanotube-based load cell for measuring a force, comprises: a block of aligned carbon nanotubes; a first multiplicity of electrodes on a first side of the block; a second multiplicity of electrodes on an opposing side of the block to the first side, the second multiplicity of electrodes corresponding to the first multiplicity of electrodes, wherein the first and second multiplicities of electrodes form a multiplicity of opposing pairs of electrodes and wherein at least two of the opposing pairs of electrodes are electrically connected in series to form a chain of opposing pairs of electrodes; and an electrical circuit for measuring the electrical resistance of the chain, the circuit being electrically connected to both ends of the chain of opposing pairs of electrodes.

Wafer assemblies for characterizing semiconductor processing tools and semiconductor processes allow the stresses induced in a wafer due to processing to be monitored. The robust stand-alone carbon nanotube load cells can be used to advantage in these wafer assemblies. According to further aspects of the invention, a wafer assembly for characterizing semiconductor processing equipment includes two parallel wafers with a plurality of carbon nanotube load cells positioned between and attached to both wafers. The load cells are independently electrically connected to a device which monitors and records the resistivity of the load cells.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
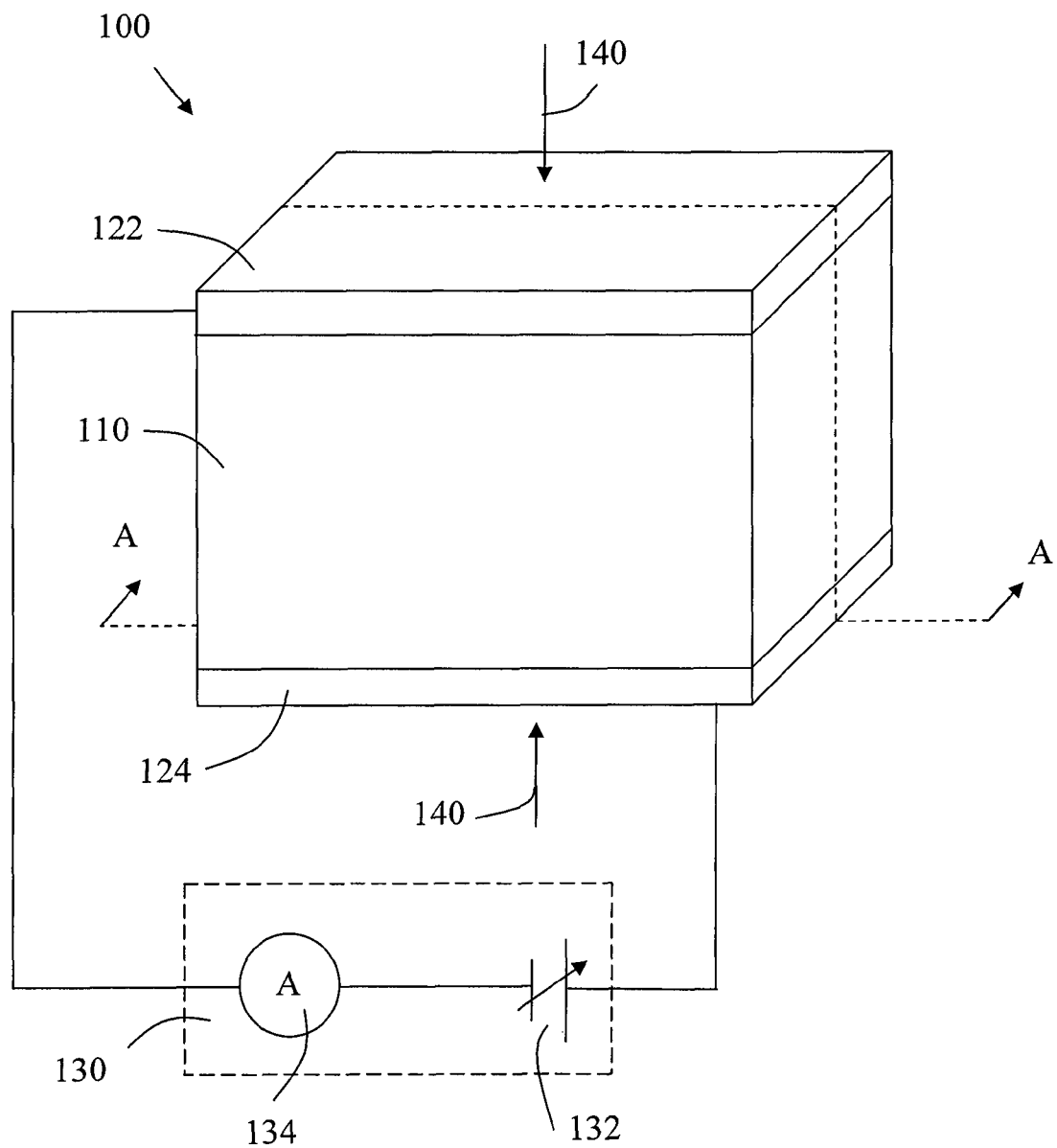
FIG. 1 shows a carbon nanotube-based load cell according to the invention.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, the present invention contemplates incorporating blocks of aligned carbon nanotubes, as strain gauges, into load cells. Furthermore, the invention contemplates configuration of electrodes on the blocks of carbon nanotubes in order to provide higher spatial resolution for stress measurement. The present invention also contemplates a test wafer assembly, incorporating carbon nanotube-based load cells.

Carbon nanotubes are nanometer-scale cylinders with walls formed of graphene—single atom thick sheets of graphite. Nanotubes may be either single-walled (cylinder wall composed of a single sheet of graphene, referred to as SWNTs) or multi-walled (cylinder wall composed of multiple sheets of graphene, referred to as MWNTs). Nanotubes have diameters as small as one nanometer, for a SWNT, and length to diameter ratios of the order of $10^6$. Blocks of carbon nanotubes, where the nanotubes are aligned parallel to each other along their lengths, can be grown using chemical vapor deposition techniques. These blocks may have end areas of 1 to 15 square millimeters, lengths (measured along the direction of the aligned nanotubes) of 0.2 to 4 millimeters, and contain millions of carbon nanotubes. See Pushparaj et al., Applied Physics Letters 91, 153116 (2007).

Nanotubes exhibit extraordinary mechanical properties, including super compressibility (greater than 33%), large changes in conductivity in response to strain (0.02 Siemens per centimeter change in conductivity per 1% change in compressive strain), and high bending and compressive strengths (14 GPa and 100 GPa, respectively, for MWNTs). See Saito et al., Physical Properties of Carbon Nanotubes, Imperial College Press, London (1998); Tombler et al. Nature 405, 769 (2000); Cao et al., Science 310, 1307 (2005); Qian et al. Appl. Mech. Rev. 55, 495 (2002); Iijima et al., J. Chem. Phys., 104, 2089 (1996); Sazonova et al., Nature 431, 284 (2004); and Min-Feng et al., Science 287, 637 (2000). These physical properties are advantageous for use of carbon nanotubes in load cells. The present invention contemplates using blocks of SWNTs and/or MWNTs to form the strain gauge component of a load cell.

FIG. 1 shows a load cell 100, according to the invention. A block 110 of aligned carbon nanotubes is shown with a top electrode 122 and a bottom electrode 124, on opposing sides of the block 110. The electrodes are electrically connected to electronics 130, for measuring changes in electrical conductivity of the carbon nanotube block 110 when a compressive force, indicated by arrows 140, is applied to the block 110. The electronics 130 is shown schematically as comprising a constant voltage source 132 and a current measuring device 134. A constant voltage (typically in the range of microvolts to millivolts) is applied between the electrodes 122 and 124 and the changes in current are measured. The changes in current are due to changes in electrical conductivity of the carbon nanotube block 110. The electrical conductivity of the block is calibrated against the compressive force applied, and thus the magnitude of the force 140 can be calculated from the measured current. In FIG. 1, the force 140 is shown as a compressive force; however, the load cell may also be used to measure tensile forces.

Figure 2:
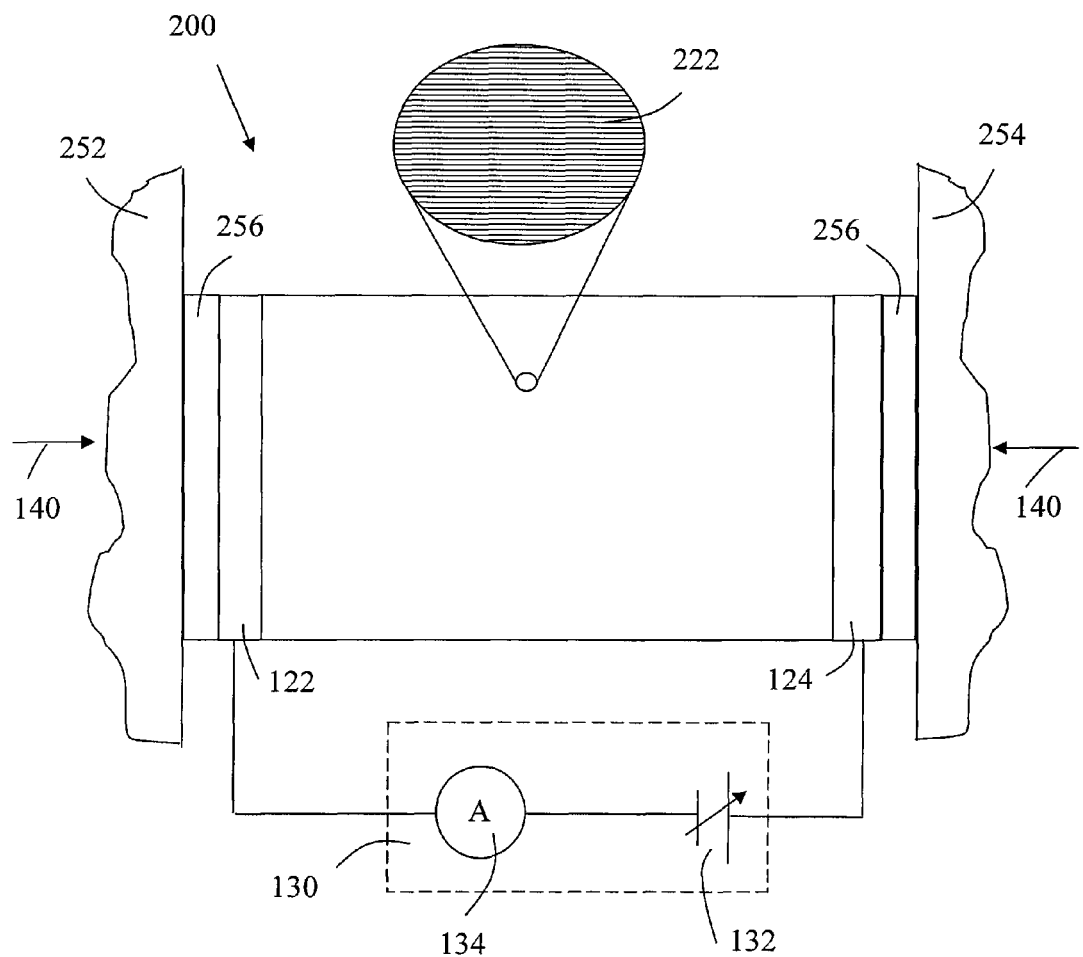
FIG. 2 shows a cross-section of a first embodiment of the load cell in FIG. 1 attached to two substrates, with the nanotubes parallel to the applied force.

FIG. 2 shows a cross-section of a first embodiment of the load cell of FIG. 1 fixed between two substrates 252 and 254. The substrates 252 and 254 are fixed to the load cell 200 by adhesive material 256. Suitable adhesive materials may include, depending on the environment, electrically conductive glues and paints. The carbon nanotubes 222 are illustrated (not to scale) as being aligned parallel to each other, along their lengths, as being perpendicular to the top and bottom electrodes 122 and 124, and as being parallel to the applied force 140.

Figure 3:
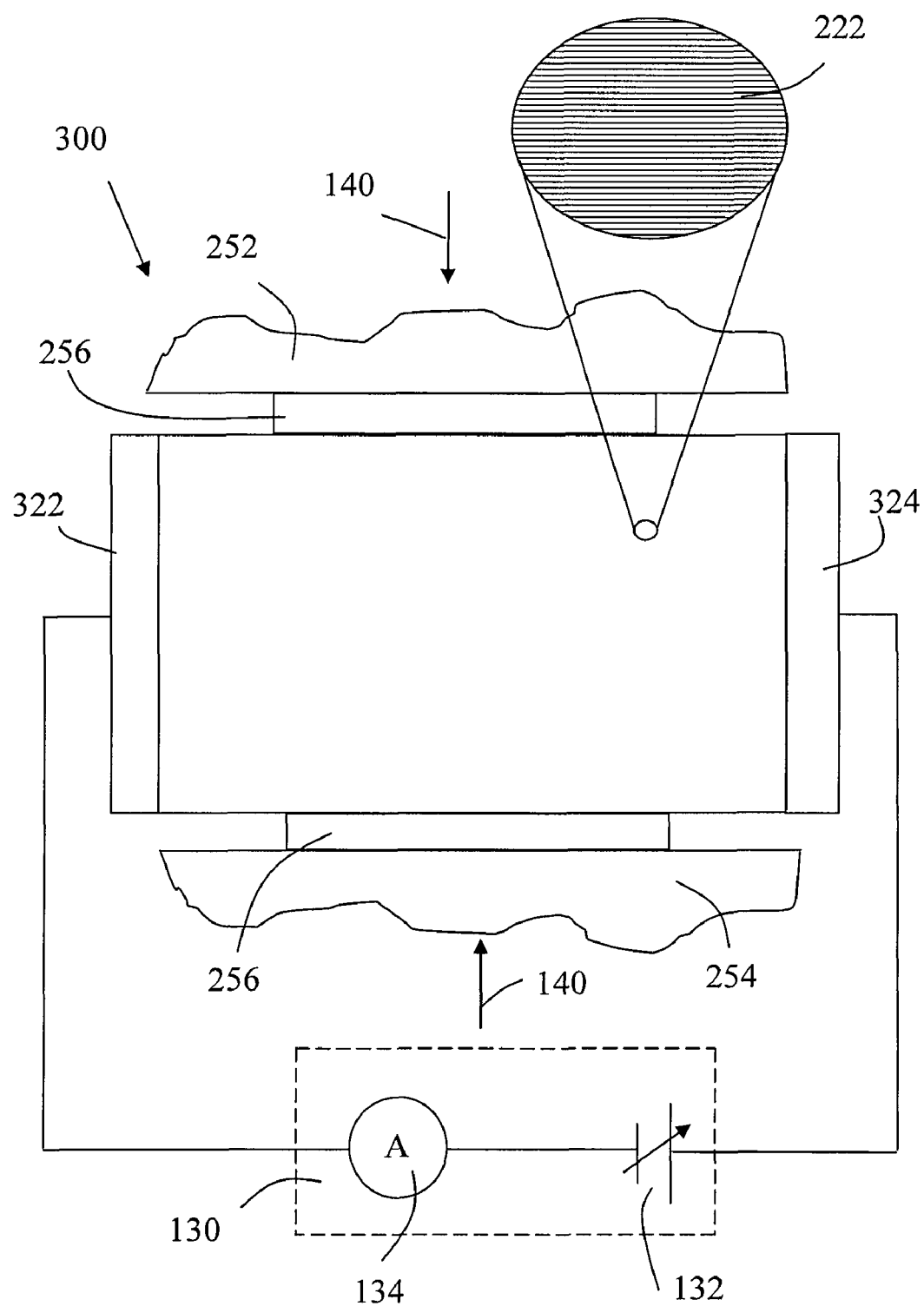
FIG. 3 shows a cross-section of a second embodiment of the load cell in FIG. 1 attached to two substrates, with the nanotubes perpendicular to the applied force.

FIG. 3 shows a cross-section of a second embodiment of the load cell of FIG. 1 fixed between two substrates 252 and 254. The substrates 252 and 254 are fixed to the load cell 300 by adhesive material 256. The carbon nanotubes 222 are illustrated (not to scale) as being aligned parallel to each other, along their lengths, as being perpendicular to the left and right electrodes 322 and 324, and as being perpendicular to the applied force 140.

In general, the first embodiment, shown in FIG. 2, is preferred over the second embodiment for measuring compressive forces since blocks of carbon nanotubes aligned parallel to the direction of the compressive force produce a greater change in conductivity for a given compressive force than do blocks of nanotubes aligned perpendicular to the force. However, when it is desirable to avoid the electrodes on the block making contact with the substrate, the second embodiment, shown in FIG. 3, is preferred.

Figure 4A:
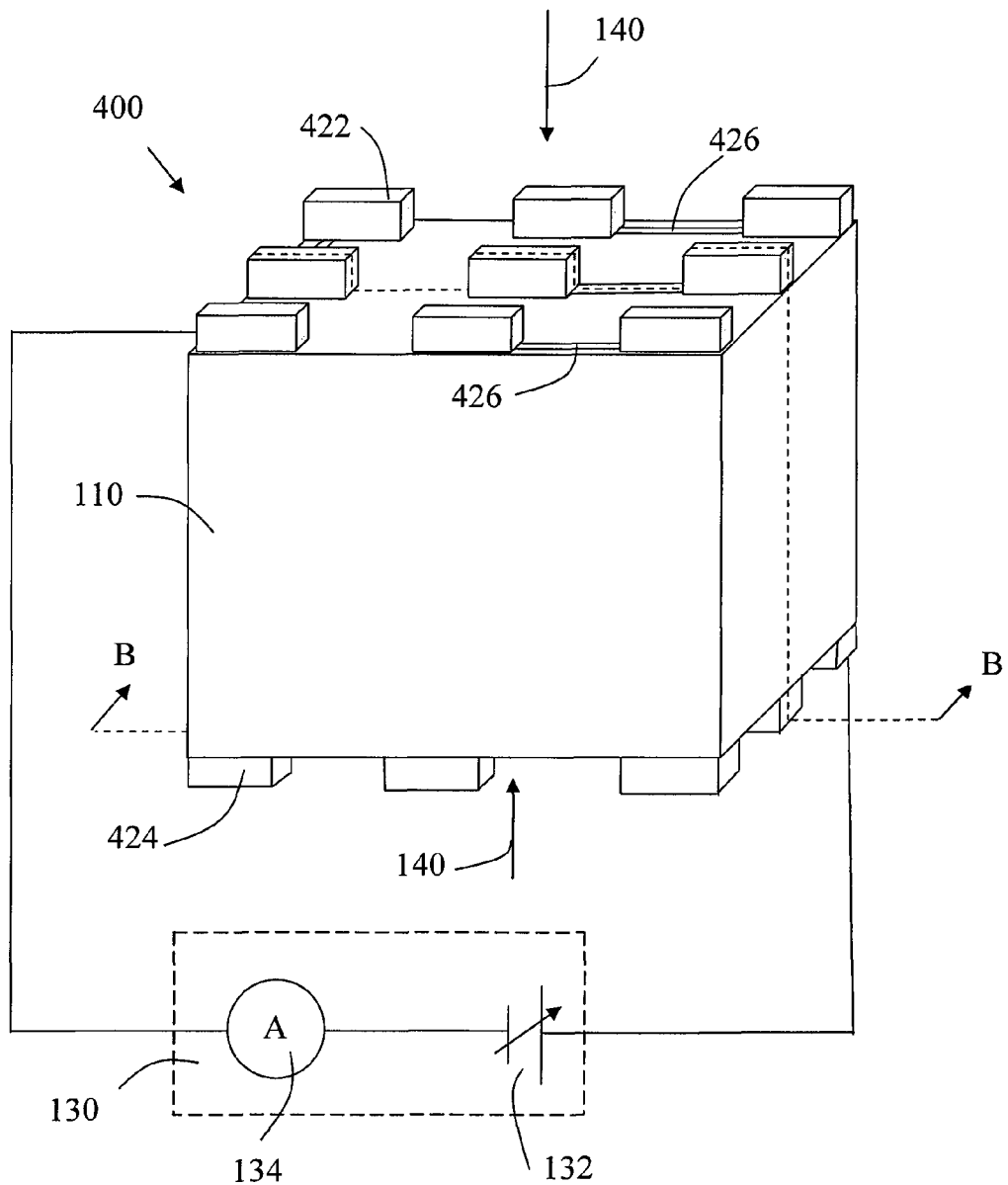
FIG. 4A shows a third embodiment of the load cell in FIG. 1, with a multiplicity of electrodes in place of a single electrode.
Figure 4B:
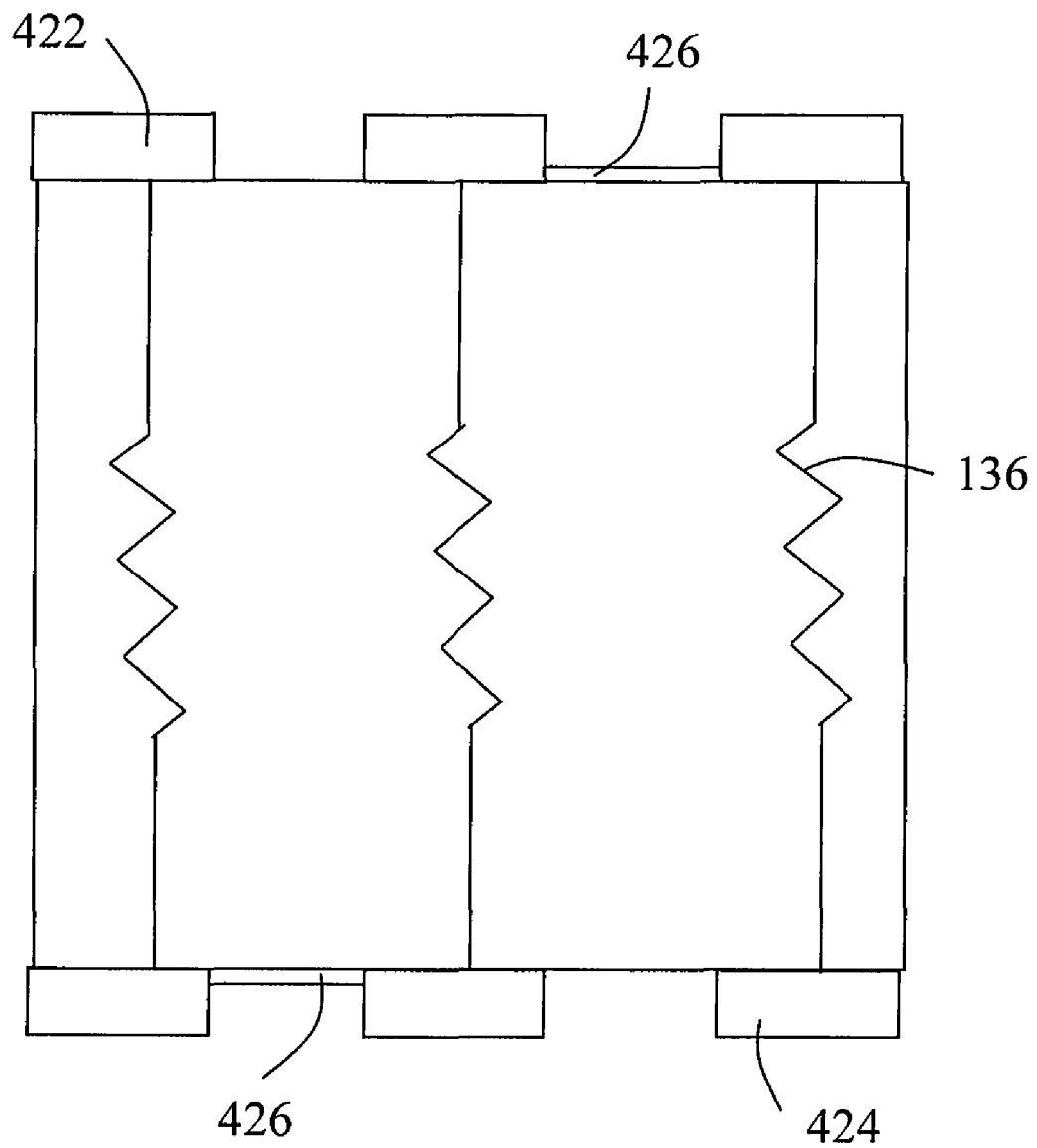
FIG. 4B shows a cross-section of the load cell in FIG. 4A.

FIG. 4A shows a load cell 400, according to the invention. A block 110 of aligned carbon nanotubes is shown with a multiplicity of top electrodes 422 and a multiplicity of bottom electrodes 424, on opposing sides of the block 110. For each electrode 422 there is a corresponding electrode 424, forming a pair of parallel, directly opposing electrodes. FIG. 4B shows a cross-section of the load cell of FIG. 4A. This cross-section illustrates the current path through the device by superimposing a schematic equivalent circuit on top of the load cell. The equivalent circuit comprises resistors 136 connected in series between the pairs of opposing electrodes. Electrical connections 426 are formed between electrodes, as shown, to connect all of the resistances between all of the pairs of opposing electrodes in series. Returning to FIG. 4A, the electronics 130 is electrically connected between one of the top electrodes 422 and one of the bottom electrodes 424, so as to complete a circuit in which all of the resistances between all of the pairs of opposing electrodes are included in series. The electronics 130 measures changes in electrical conductivity of the carbon nanotube block 110 when a compressive force, indicated by arrows 140, is applied to the block 110. The magnitude of the force 140 can be calculated from the measured current, following the approach described above in reference to FIG. 1. The electrode configuration of FIGS. 4A and 4B may provide a more sensitive strain gauge than the electrode configuration of FIGS. 1-3—for example, when the force is not uniform over the surface of the block.

Further embodiments of the invention (not shown) include variations on the load cell 400, shown in FIGS. 4A and 4B. A first variation is where each corresponding pair of electrodes 422 and 424 are independently connected to electronics 130, allowing measurement of each individual resistance 136. A second variation is where a group of adjacent pairs of electrodes 422 and 424 are connected in series to form a series chain, and the series chain is connected to electronics 130, allowing measurement of the series resistance of the group. A third variation is where a multiplicity of groups of adjacent pairs of electrodes 422 and 424 are connected in series to form a corresponding multiplicity of independent series chains, wherein each series chain is independently connected to electronics 130, allowing independent measurement of the series resistance of each group. Furthermore, the electrodes may be connected in series in many other configurations and groups as desired to suit a particular application.

Figure 5A:
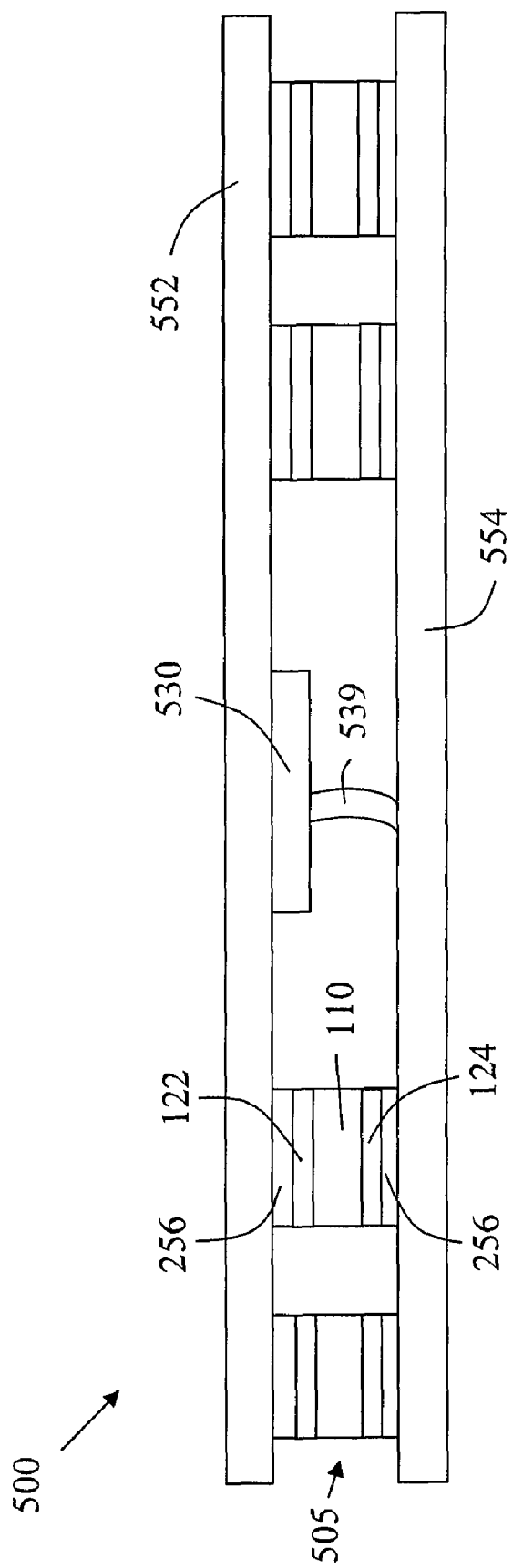
FIG. 5A shows a side view of a test wafer assembly incorporating multiple carbon nanotube load cells, according to the invention.
Figure 5B:
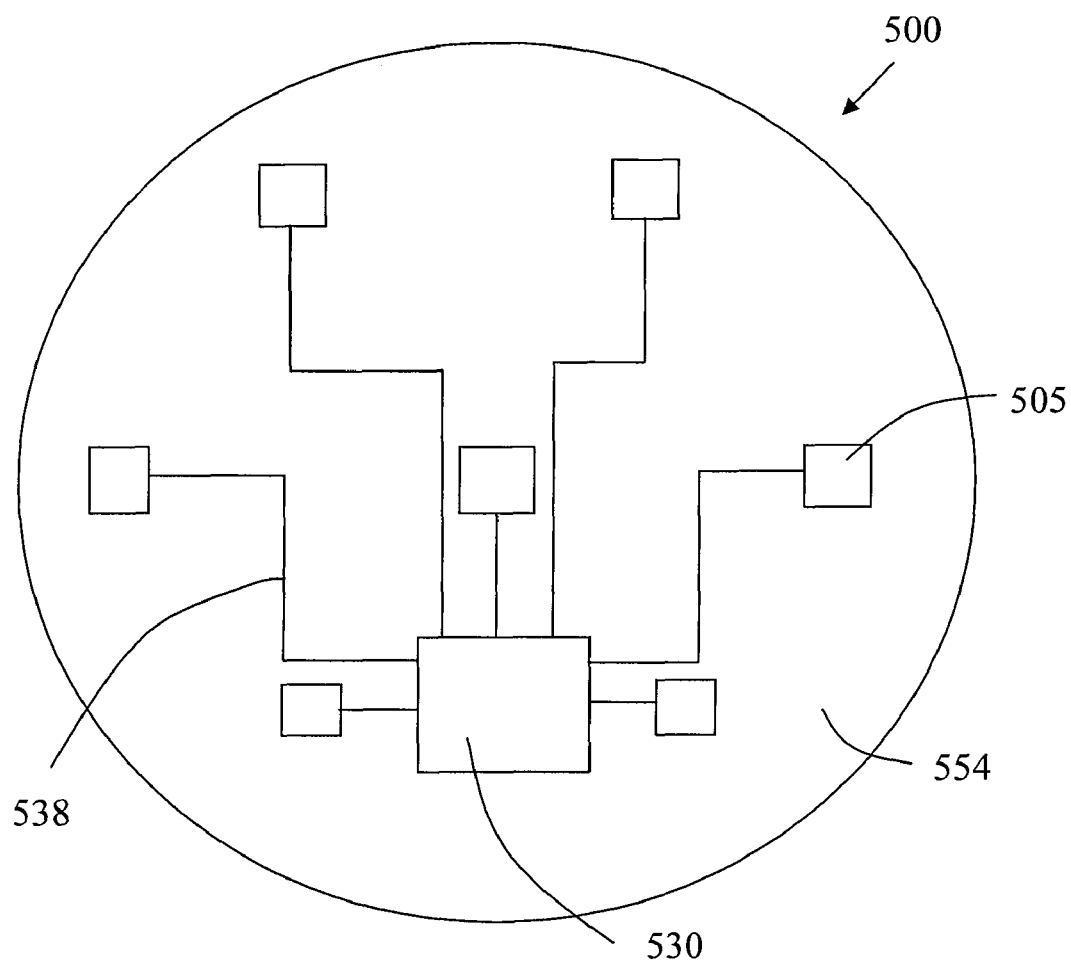
FIG. 5B shows a top plan view of the test wafer assembly in FIG. 5A, with the upper wafer removed.

FIGS. 5A and 5B show different views of a wafer assembly 500 used for characterizing semiconductor processing equipment and semiconductor processes. FIG. 5A is a side view of the wafer assembly 500 showing strain gauges 505 fixed between wafers 552 and 554. FIG. 5B is a top plan view with the upper wafer 552 removed, showing an arrangement of strain gauges 505 electrically connected by traces 538 to an electronics module 530. There are an equivalent set of traces 538 on the top wafer 552. (Not shown.) Returning to FIG. 5A, each strain gauge comprises a block 110 of aligned carbon nanotubes with a top electrode 122 and a bottom electrode 124, on opposing sides of the block 110. The strain gauges are fixed to the wafers 552 and 554 by an adhesive material 256. The traces 538 on the top wafer 552 are electrically connected to the electronics module 530 via a cable 539. The electronics module 530 comprises a constant voltage source, at least one current measuring device, a memory device and/or a communication device. Each strain gauge 505 in combination with the electronics module 530 functions as a load cell, as described above in reference to FIGS. 1-3, 4A and 4B. The electronics module 530 is configured to measure the conductivity of all of the strain gauges 505, and to either record the conductivity data in memory for future retrieval or to directly send the data to a computer. The communication device can be used to send data directly to a computer as it is being collected, or may send data from memory at a future time. Examples of communication devices include wireless transmitters, communication cables, and optical transmitters.

An example of a wafer assembly, of the type shown in FIGS. 5A and 5B, includes two 200 mm wafers with 80 carbon nanotube strain gauges equally distributed over the area of the wafer. Each of the carbon nanotube strain gauges has a base area of approximately 500×500 square microns and is 1 mm tall, where the base area is the area fixed to the wafer and the height is the dimension of the block perpendicular to the surface of the wafer. Note that the height of the carbon nanotube blocks will determine the gap between the wafers in the wafer assembly. A 200 mm wafer is typically 600 to 800 microns thick, therefore the wafer assembly will be between 2 and 3 mm thick. Each of the carbon nanotube strain gauges is independently electrically connected to an electronics package for monitoring (and recording) the conductivity of the carbon nanotube block.

The wafer assembly shown in FIGS. 5A and 5B is well suited to monitoring the stresses induced in a substrate due to semiconductor processing. The stresses can be due to mechanical, thermal and/or chemical processing of the substrate. When the substrate is monitored during processing inside a semiconductor tool, the memory device on the substrate may be utilized to store the stress data for downloading after the substrate is removed from the processing chamber. To use the wafer assembly to monitor a semiconductor process, the assembly is placed in the process tool just as a regular wafer would be, providing the extra thickness of the assembly can be accommodated.

The carbon nanotube blocks of the invention may be polymer filled carbon nanotube blocks. Polymer filled blocks may exhibit greater mechanical strength. Suitable polymers include polydimethylsiloxane (PMDS).

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:
1. A carbon nanotube-based load cell for measuring a force, comprising:

a block of aligned carbon nanotubes;
a first multiplicity of electrodes on a first side of said block;
a second multiplicity of electrodes on an opposing side of said block to said first side, said second multiplicity of electrodes corresponding to said first multiplicity of electrodes, wherein said first and second multiplicities of electrodes form a multiplicity of opposing pairs of electrodes and wherein at least two of said opposing pairs of electrodes are electrically connected in series to form a chain of opposing pairs of electrodes; and
an electrical circuit for measuring the electrical resistance of said chain, said circuit being electrically connected to both ends of said chain of opposing pairs of electrodes.

2. The load cell of claim 1, wherein said electrodes are perpendicular to said aligned nanotubes.

3. The load cell of claim 1, wherein said force is parallel to said aligned nanotubes.

4. The load cell of claim 1, wherein said force is perpendicular to said aligned nanotubes.

5. The load cell of claim 1, wherein said electrical circuit comprises a constant voltage source and a current measuring device.

6. The load cell of claim 1, wherein all of said opposing pairs of electrodes are electrically connected in series to form said chain of opposing pairs of electrodes.

7. The load cell of claim 1, wherein a first group of opposing pairs of adjacent electrodes are electrically connected in series to form a first chain of opposing pairs of electrodes.

8. The load cell of claim 7, further comprising a second group of opposing pairs of adjacent electrodes electrically connected in series to form a second chain of opposing pairs of electrodes, wherein said electrical circuit is configured to independently measure the electrical resistances of said first chain and said second chain.

9. The load cell of claim 1, wherein said block is polymer filled.

10. A test wafer assembly for characterizing semiconductor processing equipment, comprising:
a first wafer;
a second wafer, parallel to said first wafer;
a plurality of spaced-apart carbon nanotube load cells positioned between and attached to both of said first and second wafers; and
an electrical device, independently electrically connected to each of said plurality of carbon nanotube load cells;
wherein said electrical device is configured to monitor and record the resistivity of said load cells.

11. A test wafer assembly as in claim 10, wherein each of said carbon nanotube load cells comprises:
a block of aligned carbon nanotubes; and
parallel electrodes on opposing sides of said block;
wherein said electrodes are perpendicular to said aligned carbon nanotubes.

12. The test wafer assembly of claim 11, wherein said nanotubes are aligned perpendicular to said first and second wafers.

13. The test wafer assembly of claim 11, wherein said nanotubes are aligned parallel to said first and second wafers.

14. The test wafer assembly of claim 10, wherein said electrical device comprises:
a constant voltage source;
a current measuring device; and
a memory device.

15. The test wafer assembly of claim 10, wherein said carbon nanotube load cells are polymer filled.

16. The test wafer assembly of claim 10, further comprising a means for communicating data to an external computer.

17. The test wafer assembly of claim 10, wherein said electrical device is independently electrically connected to each of said plurality of carbon nanotube load cells by traces on the inner opposing surfaces of said first and said second wafers.

18. The test wafer assembly of claim 10, wherein said electrical device comprises:
   a constant voltage source;
   a current measuring device; and
   a communication device.

19. The test wafer assembly of claim 18, wherein said communication device is an optical transmitter.

20. The test wafer assembly of claim 10, wherein said test wafer assembly is between 2 and 3 millimeters thick.

21. The test wafer assembly of claim 10, wherein said plurality of carbon nanotube load cells are attached to said first and said second wafers by an adhesive material.

22. The test wafer assembly of claim 21, wherein said adhesive material is electrically conductive paint.

23. The test wafer assembly of claim 15, wherein said polymer is polydimethylsiloxane.

* * * * *